Patented Apr. 30, 1935

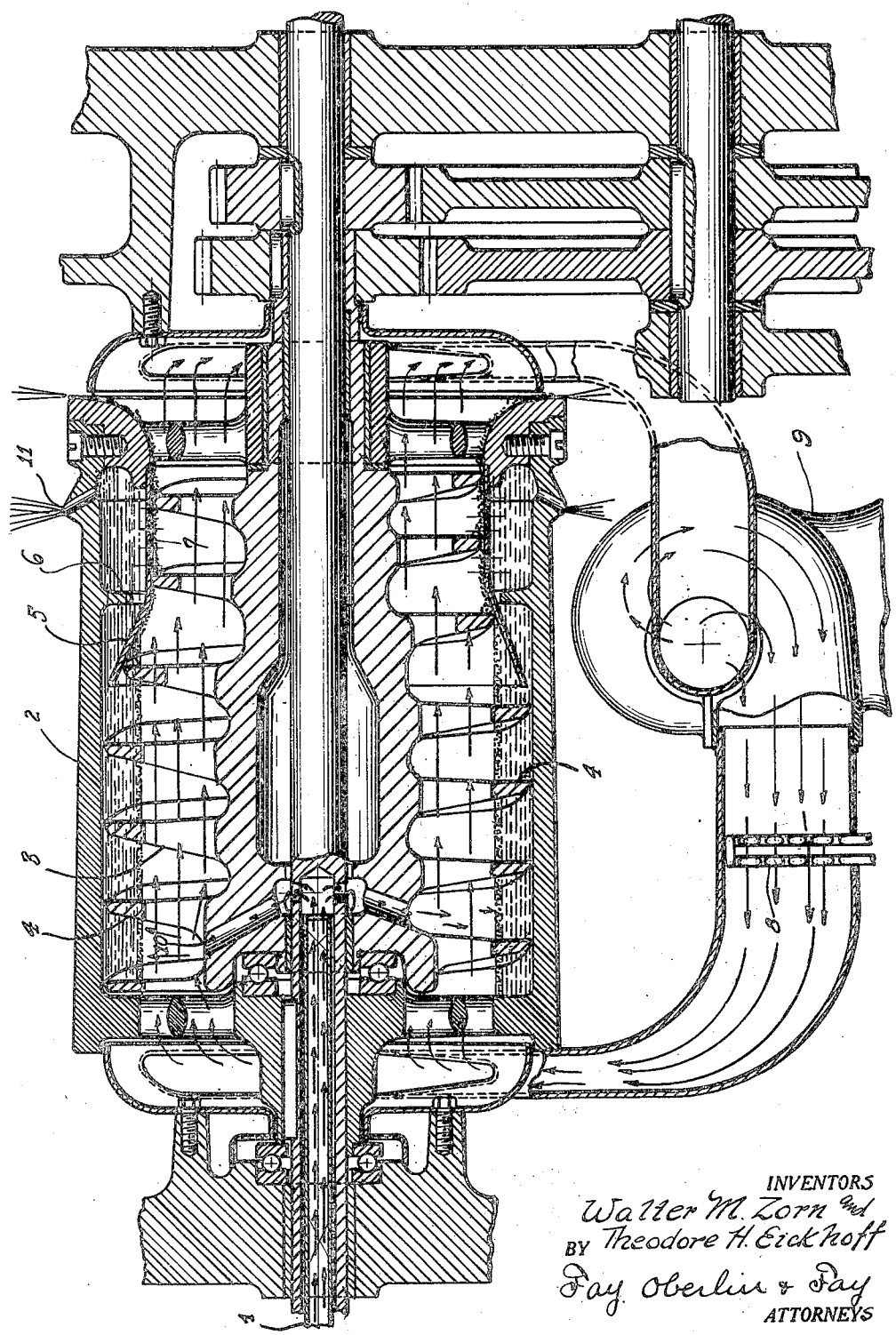

1,999,712

UNITED STATES PATENT OFFICE 1,999,712

METHOD OF TREATMENT AND CONCENTRATION OF LIQUIDS BY FREEZING

Walter M. Zorn and Theodore H. Eickhoff, East Cleveland, Ohio, assignors, by direct and mesne assignments, to The Low Temperature Processing Company, a corporation of Ohio Application June 30, 1931, Serial No. 548,012

14 Claims. (Cl. 62—124)

This invention relates, as indicated, to methods of treating and concentrating liquids by freezing, and while in the ensuing description will be outlined a method for concentration by freezing, nevertheless, it is to be understood that various steps in the treatment of material of different classes may be carried forth by the principles comprising our invention.

As is well known to those familiar with the art, numerous attempts have been made in the past to concentrate certain liquids such as fruit juices, beverages and the like by the so-called ice crystallization process which consists in subjecting the liquid to a sufficiently low temperature to cause the formation of a slush consisting of ice crystals and the liquid concentrate. Heretofore, this method of concentration has never gone into commercial usage for the reason that such method required a number of separate freezing steps in order to produce the desired degree of concentration of the liquid.

One of the difficulties heretofore encountered in all ice crystallization processes of concentration has been that the formation of the ice crystals during the freezing operation will imprison certain of the desirables, hence, reducing the yield to such an extent as to make such method impractical unless some method be employed whereby the entrapped desirables in the voids between the ice crystals be liberated to bring the yield up to a suitable percentage.

A further reason for the difficulty encountered in the satisfactory employment of any method of ice crystallization for the purpose of concentration has been that as the water is removed from the liquid by crystallization, the residual concentrate usually becomes very adhesive in character so that the same adheres to the surface of the crystals and accordingly, the usual methods of filtration have been found undesirable for the purpose of separating the crystals and the adhering concentrate.

This imprisonment of the desirables upon the crystallization of the water with which the desirables are diluted, it is believed, may be best understood by a careful analysis of the actual manner in which the freezing operation progresses.

Immediately upon the reduction of the temperature of the liquid to the point where freezing of the water begins, of course ice crystals begin to form. These ice crystals in the types of material suitable to be concentrated by the ice crystallization process will consist principally of water. The ice crystals, in their formation, will exclude the materials other than water so that if such mass of crystals could be separated, the same would be found to be pure snow.

However, as the freezing progresses in the body of liquid, the formation of adjacent ice crystals will proceed to a point where the crystals will become united along their contacting faces and in this manner, entrap the material which is forced to the surface of the ice crystals upon the formation thereof and which material is the desired ultimate concentrate.

As hereinbefore stated, while not all of the desirables may be so imprisoned between the ice crystals, nevertheless, a sufficient quantity will be so trapped as to reduce the yield to below a practical point.

It has been the custom, therefore, in all ice crystallization processes to break up the crystalline mass either by raising the temperature thereof or by crushing action. Regardless, however, of the means employed for disintegrating the crystalline mass, it is evident that the work performed or the heat applied will cause a melting of certain of the crystals or portions thereof so that while the previously entrapped desirables are reclaimed, nevertheless, the reclaimed material is in diluted form.

It is believed that when a body of water containing the desirables sought to be secured in concentrated form by the ice crystallization process is subjected to a freezing action, the area of such material lying next adjacent the refrigerating area will solidify in the following manner:

That portion of the liquid next to the coldest area will have first formed therein the ice crystals. The formation of the crystals will proceed progressively into the interior of the body of material until the same becomes either a solid crystalline mass or until the materials crowded out by the formation of the crystals will occupy a central area or an area farthest removed from the application of the cold which will not freeze until a considerable further reduction in temperature takes place.

When the material is supported in a quiescent state and the temperature reduced sufficiently to cause a freezing of the entire body of the material, as above described, the formation of the ice crystals will proceed so rapidly as not to permit this material crowded out by the ice crystals to localize in a single area so that substantially all or at least a large part of such material is entrapped in the crystalline mass.

Even though the rate of freezing is reduced to a very minimum it will still be found that a large percentage of the material desired to be concentrated is entrapped between the crystals during their formation.

It is among the objects of our invention to provide a method of treatment and concentration of liquids by the ice crystalline process which shall have none of the above named undesirable characteristics but which may be carried on as a continuous operation and with the production of a resultant concentrate of proper Baumé.

Other objects of our invention will appear as the description proceeds.

To the accomplishment of the foregoing and related ends, said invention, then, consists of the steps hereinafter fully described and particularly pointed out in the claims:

The annexed drawing and the following description set forth in detail one approved method of carrying out the invention, such disclosed method, however, constituting but one of the various ways in which the principle of the invention may be used.

In said annexed drawing is illustrated a transverse sectional view of one form of apparatus illustrated somewhat diagrammatically for carrying forth the method comprising our invention.

The steps comprising the novel method of our invention may be enumerated as follows:

The suitable liquid containing water or the like which is to be concentrated by a removal of such water by the ice crystallization process will be prepared in any suitable manner. If a concentrate of liquid coffee is to be prepared, the coffee will be infused in a suitable manner so that the water or like infusion liquid will draw off from the ground beans a maximum of desirables and a minimum quantity of the undesirables usually present in coffee. After the infusion has been completed, liquid coffee to be concentrated may be cooled to just slightly above the freezing point. The above illustration of a liquid coffee has been chosen simply as an example and it is to be understood that the principles comprising our invention are applicable to the concentration of a large class of liquids of which liquid coffee is only one example.

After the liquid to be concentrated has been suitably reduced in temperature, the same will be passed through the apparatus which is diagrammatically illustrated in the drawing.

As above pointed out, such apparatus may be designed to accommodate liquids supplied thereto at almost any temperature but the size of the machine may be reduced and the efficiency of its operation, it is believed, may be appreciably increased if the liquid to be concentrated is supplied thereto at a temperature which is substantially that of the freezing temperature of the liquid which is to be crystallized by the subsequent refrigeration. With the infusion at the temperature above specified, the same will be introduced to the apparatus illustrated in the drawing through a conduit generally indicated at 1.

The apparatus illustrated in the drawing and which may be employed for the purpose of carrying forth the principles comprising our invention, may consist of a hollow drum 2 which rotates at a relatively high speed. Mounted co-axially with the drum 2 is a conveyor member 3 which will rotate in the same direction as the drum 2 but at a slightly different speed, either greater or less. The conveyor 3 is provided with a plurality of helical lands 4, which, upon relative rotation between the members 2 and 3, will cause an axial movement through the apparatus of any material which is encountered by these lands. To the inner periphery of the rotating shell 2 are secured baffles 5 and 6 for the purpose hereinafter more fully explained.

Mounted in spaced relation to the inner periphery of the outer shell 2 and secured thereto at the discharge end of the apparatus is a peripheral baffle 7, preferably of suitable foraminous material and having an inner periphery only slightly in excess of the outer periphery of the lands of the conveyor 3 in this portion of the apparatus.

A suitable refrigerating unit 8 may be employed for the purpose of supplying a stream of chilled gas to the apparatus. This stream of refrigerating gas, which may be air, hydrogen, carbon dioxide, etc., may be forced through the apparatus by means of a fan 9 or the like. It will be noted that for certain speeds of the apparatus and notably for certain relative speeds of rotation between the conveyor and the outer shell and even if the conveyor is entirely omitted, the velocity at which the shell rotates will in itself act as a fan to force the stream of refrigerant gas therethrough and in contact with the liquid built up on the inner periphery thereof so that it may not be necessary to employ the fan 9 for effecting the necessary circulation of the refrigerant.

With the above described form of construction in mind, it is believed that the method comprising our invention may be outlined as follows:

The liquid sought to be concentrated is introduced to the apparatus through the conduit 1 from which it escapes radially through the port or ports 10. The liquid, in being thrown radially under the influence of centrifugal force created by virtue of the rapid rotation of the members 2 and 3, will be violently impinged against the inner periphery of the drum 2 at the left end as viewed in the drawing. It will be noted that as the liquid is thrown radially outwardly it must pass through the stream of refrigerated gas entering the apparatus. Proper regulation of the temperature of the liquid and the gas, as well as the rate and character of feed, may result in the formation of ice crystals as the liquid moves through this space. The liquid will be introduced in this manner until a bath of suitable thickness is built up on the inner periphery of the drum 2, thickness of such bath, of course, being determined by the inward radial extent of the baffle 6 secured to the inner periphery of the drum 2. The outer periphery of the conveyor lands 4 will be equal to or slightly greater than the inner periphery of the wall of liquid built up on the inner periphery of the drum 2 and determined by the baffle 6.

With respect to the dimension of the outer periphery of the conveyor, it will be noted that we may prefer to make this dimension such that the conveyor will dip into the wall of liquid on the inner periphery of the drum 2 for a short distance as above explained only adjacent the receiving end of the apparatus and the relative dimensions of the conveyor and the inner diameter of the wall of liquid throughout the balance of the apparatus be maintained in such manner that the conveyor will not agitate the liquid only at the receiving end so that as the snow and ice crystals are moved axially of the apparatus by the conveyor, such crystals will not be brought in contact with the concentrate in that portion of the body of the liquid removed from the receiving end of the apparatus.

It is desirable that the formed ice crystals be kept separate from this concentrate due to the fact that the adhesive character of the concentrate which the ice crystals were permitted to come into contact therewith would interfere with the removal of the crystals from the apparatus.

As previously intimated, for certain types of material and for the accomplishment of certain ends within the contemplation of the method comprising our invention, we may prefer to omit the conveyor, the primary function of which has previously been described, to remove the ice crystals from the apparatus. If a sufficient velocity is given to the refrigerant flowing through the apparatus and in contact with the above, it has been successfully demonstrated by tests that such gas flowing at high velocity will of itself produce a marked agitation of the liquid and further serve as a means for carrying off the formed ice crystals which leave the apparatus in the form of a cloud of snow. When the refrigerant stream, therefore, is relied upon to remove the crystals or snow from the bath we may, however, desire to employ a suitable means for mechanically adjusting the bath and then such agitation may be accomplished by any suitable means such as discs, vanes and the like, which will be caused to rotate in a suitable manner in the bath of liquid built up on the inner periphery of the drum 2.

In the treatment of certain kinds of material, it has been found that the centrifugal force to which the same is subjected during the concentration process will cause a precipitation of certain substances which are preferably removed from the ultimate concentrate. When such is the case, i. e., when certain materials have a tendency to precipitate and, therefore, be thrown upwardly against the inner periphery of the shell 2, the outer periphery of the conveyor may be made substantially equal to the inner periphery of such shell and then by rotating the conveyor relatively to the shell but in such a direction as to force such precipitate solids counter to the direction of liquid flow in the bath, such precipitate solids may be discharged from the apparatus adjacent the receiving end. In order to facilitate and insure the liquid flow in the proper direction from the receiving end of the apparatus to the discharging end, we may prefer to have the shell 2 in the form of a cone so that even though the conveyor moves the precipitate along the wall towards the receiving end of the apparatus, nevertheless, the inclination of the wall will cause the liquid concentrate from which the ice crystals have been removed, to flow to the discharge end of the apparatus. When the conveyor is employed for the purpose of removing the precipitate in the manner described, then such conveyor may also be employed for the purpose of removing the ice crystals in the manner previously described. However, as above stated, it may be advisable to rely solely upon the high velocity stream of refrigerant flowing through the apparatus to blow off the crystals which have been formed and employ the conveyor for the sole purpose of removing the precipitated material.

The violent projection of the liquid to be concentrated into the bath, coupled with the force exerted on such liquid by virtue of the differential in the speed of rotation between the members 2 and 3, will cause a violent agitation or turbulence of the material in such bath so that a very large surface of such material will be exposed to the draft of refrigerating gas passing therethrough under the influence either of the centrifugal force in the machine itself or the fan 9 employed for the purpose of establishing such stream of refrigerating gas.

A proper balance in temperatures will be maintained so that this agitated surface of the bath adjacent the receiving end of the apparatus will be frozen and the particles of frozen material which will be in the form of snow will, in some cases due to the decrease in the specific gravity of the material by virtue of its being frozen, float on top of the bath and be carried axially of the apparatus under the influence of the conveyor lands or the air stream.

As this freezing operation continues, it will be noted that there is no tendency whatsoever for the liquid not frozen becoming entrapped in the crystals formed by the freezing. There is no trapping of such material by the ice crystals due to the fact that the freezing is actually accomplished while such material is under the influence of a terrific centrifugal force which will immediately wipe clean every crystal as soon as the same is formed.

The action may, therefore, be described as the formation of a relatively thin film of ice crystals over the body of material which is subject to a centrifugal force and as soon as such crystals form, removing the same from the surface so as to permit a formation of a new film.

As the freezing operation continues, the water will be extracted from the bath of material by virtue of the ice crystals being moved therefrom by the conveyor 3 so that the material in its concentrated form will move axially along the inner periphery of the shell 2 under the baffle 5. As additional material is added so that the layer of liquid on the inner periphery of the shell 2 exceeds the inward radial extent of the baffle 6, the excess of the concentrate will spill over this baffle and be discharged through the orifice 11. It will be found that the material discharged from the orifice 11 is usually of sufficient concentration so that no further steps need be taken in concentrating the same to the desired point.

As the ice crystals form on the surface of the bath and are conveyed therefrom under the influence of the conveyor 3, the agitation of the liquid in the bath, as hereinbefore explained and due to the fact that such crystals, by virtue of being in contact with the bath of unfrozen liquid, may have adhering to their surface the slight films of unfrozen concentrate which should be reclaimed if the yield is to be maintained at a maximum. We provide for the recovery of such concentrate adhering to the ice crystals by passing such crystals off from the bath onto a rotating member which is preferably foraminous in character. The centrifugal force to which the snow or ice crystals are subjected as the same move axially through the apparatus and over the foraminous wall 7 under the influence of the conveyor 3 or the air stream will, due to the fact that as the crystals move along, the same are agitated, cause a separation of the concentrate and the crystals, by virtue of the concentrate being thrown outwardly through the apertures in the member 7 and against the inner periphery of the discharge end of the shell 2. Due to the agitation to which the crystals are subjected in the removal of this adhering film of concentrate, it may be that the liquid discharge from the right end of the machine, as illustrated in the drawing, will be diluted to the extent that a further action will be necessary in order to reduce the same to the desired concentrate state. If this should be necessary, such material discharge from the right end of the machine may be added to the infusion or like liquid sought to be concentrated which is introduced at the left end of the machine in the manner previously described.

In this manner the yield may be brought to a maximum. The operation of concentration by ice crystallization may be carried on continuously and there is no imprisonment of the desirable concentrate between the ice crystals either upon formation or during the subsequent separation.

By virtue of the fact that the liquid sought to be concentrated is reduced to a frozen state almost instantaneously, reduces the time interval required to a very minimum and makes possible the production of liquid concentrates on a commercial basis at costs which are practical.

There are numerous other advantages of the method comprising our invention which, it is believed, will be so apparent to those familiar with the art that a further description thereof is unnecessary.

While in the above description we have referred continuously to the concentration of liquids by freezing the water present therein into ice crystals and then removing such crystals from the body of liquid, thereby producing a concentration thereof, nevertheless, it is to be understood that the treatment of material as outlined in the above description, which consists in subjecting the same to a refrigerating atmosphere while under the influence of centrifugal force, may be employed for the purpose of treating materials other than the type specified for the purpose of achieving objects other than concentration.

It may be for certain types of material and depending upon the class of material which is to be removed in order to produce the concentrate, that no crystals such as ice crystals will actually be formed. If the refrigeration or reduction in temperature of the particular material causes a suitable physical change therein so that there is a differential in the specific gravity of the desirables and undesirables, the method comprising our invention may be employed for the purpose of effecting a separation of such materials.

Notably, in the case of diluting lubricating oils and the like, wherein the desirables, upon a refrigeration or chilling, will have a lower specific gravity than the undesirables, it will be noted that the method comprising our invention, which, due to their number, will not be considered in further detail but which will be apparent to those familiar with the art upon an understanding of the principles of our invention.

The hereinbefore described method of treatment and concentration of material is characterized by the fact that the same may be carried on continuously, i. e., the material is fed continuously to the apparatus and is withdrawn therefrom in a like manner after suitable separation has occurred.

It will be noted, however, that the principles of the above described method of separation or concentration may be carried on by means of a so-called "batch method". When a batch method is desired, a suitable quantity of material will be introduced to the apparatus until a wall of sufficient thickness of the material is built up on the inner periphery of the rotating drum. The material will then be rotated at a high velocity and subjected to a stream of refrigerated gas until it is found that the inner periphery of this wall of liquid is frozen into a crystalline mass. The operation may then be discontinued and the crystals removed in any suitable fashion, leaving the concentrate which will likewise be drawn off in any well known manner; or the operation may continue until the entire mass is reduced to a crystalline state when it will be found that the outer layers of such crystalline mass will contain a major portion of the concentrate and the inner layers will be found to comprise principally pure water. While this last-named so-called batch method is not as efficient as the previously described continuous method of separation, nevertheless, it will be noted that the same may be employed for the purpose of practicing the principles comprising our method of concentration by ice crystallization.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:

1. The method of concentrating liquids which consists in establishing a layer of liquid on the inner periphery of a rotating shell, agitating such liquid, freezing the inner periphery of such layer, and conveying away the frozen particles as they form.

2. The method of concentrating liquids by ice crystallization which consists in establishing a layer of liquid on the inner periphery of a rotating shell, refrigerating the inner periphery of said layer to form ice crystals thereon, and conveying away the crystals as the same are formed.

3. The method of concentrating liquids by ice crystallization which consists in establishing a layer of liquid on the inner periphery of a rotating shell, agitating such liquid, refrigerating the inner periphery of such liquid to form ice crystals thereon, and conveying away such crystals as the same are formed.

4. The method of concentrating liquids by ice crystallization which consists in establishing a layer of liquid on the inner periphery of a rotating shell, refrigerating the inner periphery of such layer by a stream of gas, and conveying away the ice crystals formed by such refrigeration.

5. The method of concentrating liquids by ice crystallization which consists in establishing a layer of liquid on the inner periphery of a rotating shell, and subjecting the surface of said liquid to a stream of refrigerating gas to cause the formation and removal of ice crystals separate from the discharge of the remaining liquor concentrate.

6. The method of concentrating liquids by ice crystallization which consists in establishing a layer of liquid on the inner periphery of a rotating shell, agitating such material and subjecting the surface thereof to a stream of refrigerating gas to cause the formation of ice crystals, and then removing such crystals from such layer.

7. The method of concentrating liquids by ice crystallization which consists in centrifuging a continuous stream of liquid and simultaneously freezing a portion thereof into a solid, and separately discharging the resultant liquor and frozen solids as such freezing action continues.

8. The method of concentrating liquids by ice crystallization which consists in centrifuging a continuous stream of liquid and simultaneously agitating such liquid and freezing a portion thereof into a solid, and then separately discharging the resultant liquor and solids as said freezing action continues.

9. The method of concentrating liquids by ice crystallization which consists in centrifuging a continuous stream of liquid, subjecting the inner periphery of such stream to a freezing action to form solids, discharging in separate streams the resultant liquor and frozen solids and subjecting the such solids to a further centrifuging operation.

10. The method of concentrating liquids which consists in centrifuging a continuous stream of liquid and simultaneously freezing a portion of such liquid, discharging the liquor concentrate and subjecting the frozen solids to a further refrigeration and simultaneously centrifugally treating the same.

11. The method of concentrating liquids by ice crystallization which consists in centrifuging a continuous stream of liquid, subjecting the inner periphery of such stream to a freezing action to form solids and discharging the frozen solids independently of the remaining liquor concentrate and through a further treating zone.

12. The method of concentrating liquids which consists in projecting a stream of such liquid through space to the inner periphery of a rotating shell, passing a stream of refrigerated gas over said liquid in space and that impounded on the wall of said shell to form ice crystals, and conveying away the frozen crystals as they form.

13. The method of concentrating a liquid solution which consists in projecting a stream of such liquid through space in the presence of a gas refrigerated to a temperature which will convert a portion of the solvent in said solution into ice crystals and separating the unfrozen liquid residue from the crystals so formed.

14. The method of concentrating liquids which consists in projecting a stream of such liquid through space to the inner periphery of a rotating shell, passing a stream of refrigerated gas over said liquid in space to form ice crystals, and conveying away the frozen solids so formed.

WALTER M. ZORN.
THEODORE H. EICKHOFF.